US006777833B1

(12) United States Patent
Williams

(10) Patent No.: US 6,777,833 B1
(45) Date of Patent: Aug. 17, 2004

(54) MAGNETIC LEVITATION STAGE APPARATUS AND METHOD

(75) Inventor: Mark E. Williams, Windham, NH (US)

(73) Assignee: Ultratech Stepper, Inc., San Jose, CA (US)

( * ) Notice: Subject to any disclaimer, the term of this patent is extended or adjusted under 35 U.S.C. 154(b) by 63 days.

(21) Appl. No.: 10/023,144

(22) Filed: Dec. 17, 2001

(51) Int. Cl.[7] .............................................. H02K 4/00
(52) U.S. Cl. ...................................... 310/12; 310/90.5
(58) Field of Search ............................ 310/12, 13, 14, 310/15, 90.5

(56) References Cited

U.S. PATENT DOCUMENTS

| | | | |
|---|---|---|---|
| 5,157,296 A | 10/1992 | Trumper | 310/90.5 |
| 5,196,745 A | 3/1993 | Trumper | 310/12 |
| 5,294,854 A | 3/1994 | Trumper | 310/90.5 |
| 5,699,621 A | 12/1997 | Trumper | 33/1 M |

OTHER PUBLICATIONS

M. E. Williams et al., *Magnetic Levitation Scanning Stages for Extreme Ultroviolet Lithography*, ASPE 14th annual meeting, Monterey CA., Nov. 1999.

John B. Wronosky, et al., *Wafer and Reticle Positioning System for the Extreme Ultraviolet Lithography Engineering Test Stand*, SPIE, Feb. 2000.

Primary Examiner—Thanh Lam
(74) Attorney, Agent, or Firm—Allston L. Jones

(57) ABSTRACT

A magnetic levitation (maglev) stage apparatus and method is disclosed. The maglev stage includes a movable platen having an upper surface capable of supporting a workpiece. A set of magnet arrays is arranged on the bottom surface of the platen, and first and second side magnet arrays are arranged on opposite sides of the platen. A support frame at least partially surrounds the platen on the first and second sides and the bottom surface. A plurality of motor coils is arranged on the support frame so as to be in operable communication with the set of magnet arrays and the side magnet arrays. The magnet arrays and motor coils are operable to magnetically levitate the platen within the support frame and move the platen in up to six degrees of freedom (DOF), with all forces directed through the center-of-gravity of the platen along the DOF axes. Movable counterweights may also be employed to facilitate the smooth movement of the platen.

70 Claims, 8 Drawing Sheets

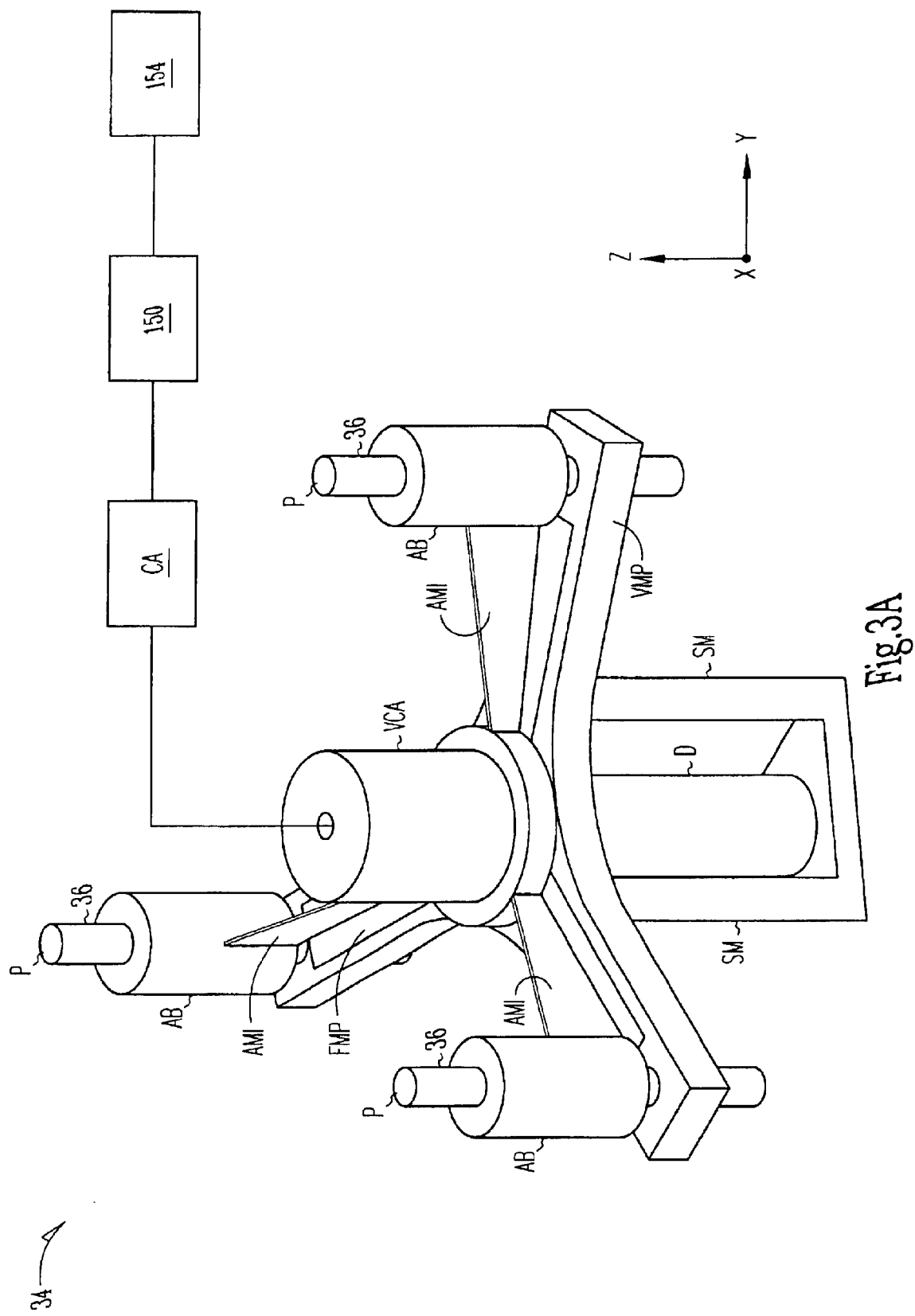

MAGNETIC LEVITATION STAGE APPARATUS AND METHOD

BACKGROUND OF THE INVENTION

1. Field of the Invention

The present invention relates to stages that support and move a workpiece, and in particular relates to magnetic levitation (maglev) stages.

2. Description of the Related Art

There are many industrial applications that require precise movement and positioning of a workpiece. In the case of semiconductor manufacturing, the workpiece is a semiconductor wafer moved and positioned with respect to the projection lens (or other system reference) of the photolithography system. This movement and positioning is accomplished by placing the workpiece on a precision stage capable of moving in three linear and three rotational dimensions. The required movements in the linear dimensions are often as small as nanometers and in the rotational dimensions as small as micro-radians.

The first lithography systems used stages that employed direct drive mechanisms for providing motion, such as contact bearings and lead screws. Rails were used to provide sliding or rolling contact of the stage over a large stage base. As the demands on the lithography process increased (e.g., greater throughput, faster printing, more accurate alignment, smaller device features, etc.), demands on stage performance (e.g., greater stage speed, higher accuracy, less vibration, longer lifetime, etc.) also increased. This led to the development and use of more precise and stable non-contact bearings, such as gas and fluid bearings, and later, magnetic levitation ("maglev") bearings.

Maglev bearings have a number of advantages over other types of non-contact bearings, such as providing six-degrees-of-freedom (DOF) from a monolithic workpiece carrier, mechanical simplicity, and inherent isolation from seismic disturbance forces. U.S. Pat. Nos. 5,157,296, 5,196,745, 5,294,854 and 5,699,621 describe various types of maglev stages for lithography systems. Further, the article by M. E. Williams et al., entitled *Magnetic Levitation Scanning Stages for Extreme Ultraviolet Lithography*, ASPE 14th annual meeting, Monterey Calif., November 1999, also discusses maglev stages.

Prior art lithography system stages have an acceleration of about 0.15 g and velocities under 300 mm/sec. Also, the platens of prior art stages have not been especially massive, particularly when compared to the anticipated needs of next-generation stages. Consequently, vibration generation from stage movement has not been as severe a problem in the past However, because of the demands for next-generation lithography, the next-generation lithography systems will require more massive stages (e.g., to accommodate larger wafers), higher velocities, and greater acceleration (e.g., 2 g).

The control force in a maglev stage is provided by actuators magnetically coupled to a mass (e.g., a stage base) significantly more massive than the platen. The application of force to the platen results in a reaction force that is transmitted to the larger mass through a structural support. This reaction force can create undesirable broadband vibrations that can be transmitted to other portions of the lithography system, as well as to tools and instruments residing nearby. In the next-generation stages, the broadband vibrations from these reaction forces will be significant and have the potential to adversely affect the performance of the lithography system.

Typical prior art maglev stages have a wafer carrier that has a first section kinematically mounted to a larger second section. This mounted section supports the wafer and includes mirrors used by one or more interferometers to determine the stage position. A kinematic mount is used to decouple the interferometer mirror from control forces that could distort the mirror surface. The need for a kinematically mounted wafer carrier section in prior art maglev stages is due to the fact that the applied forces that position the stage are overconstraining. An overconstralning force is one that when applied will not change the stage position or orientation but will instead distort the structure. Unfortunately, the need for a kinematically mounted section complicates the design of the stage.

Thus, as the demands on the lithography process continue to grow, so do the demands on stage performance. Accordingly, improved maglev stage designs are needed to meet the heightened lithography process demands.

SUMMARY OF THE INVENTION

A first aspect of the invention is a magnetic levitation (maglev) stage apparatus. The apparatus includes a platen having an upper surface capable of supporting a workpiece. In an example embodiment, the platen is formed as a grid made up of carbon-fiber sheets. A set of magnet arrays is arranged on the bottom surface of the platen. First and second side magnet arrays are arranged on opposite sides of the platen. A support frame at least partially surrounds the platen on the opposite sides and the bottom surface. Motor coils are arranged on the support frame so as to be in operable communication with the set of magnet arrays and the side magnet arrays. The magnet arrays and motor coils are operable to magnetically levitate the platen within the support frame and move it in up to six degrees of freedom (DOF). The center of force applied to the platen is coaxial with the stage principal axes in the three translational DOF (i.e., X, Y and Z).

A second aspect of the invention is the above-described stage apparatus, further including movable counterweights arranged adjacent the outer sides of the support frame. The counterweights are adapted to move in opposition to the platen to cancel the platen accelerating forces.

A third aspect of the invention is a method of moving a workpiece supported by a platen. The method includes arranging a plurality of magnet arrays on one or more of the platen surfaces so that the magnet arrays are arranged symmetrically about the center of gravity of the platen. Further, motor coils are provided on a support frame that partially surrounds the platen. The motor coils are then operatively coupled one to each magnet array so that one or more forces may be applied to the platen along one or more axes passing through the center of gravity of the platen to move the platen in up to six degrees of freedom.

A fourth aspect of the invention is the above-described method, wherein the counterweights are moved in opposition to the motion of the platen to cancel the platen accelerating forces.

BRIEF DESCRIPTION OF THE DRAWINGS

FIG. 3A is a top-down perspective view of an example embodiment of the wafer lift assembly of FIG. 2;

DETAILED DESCRIPTION OF THE INVENTION

The present invention relates to stages that support and move a workpiece, and in particular relates to magnetic levitation stages.

Figure 1:
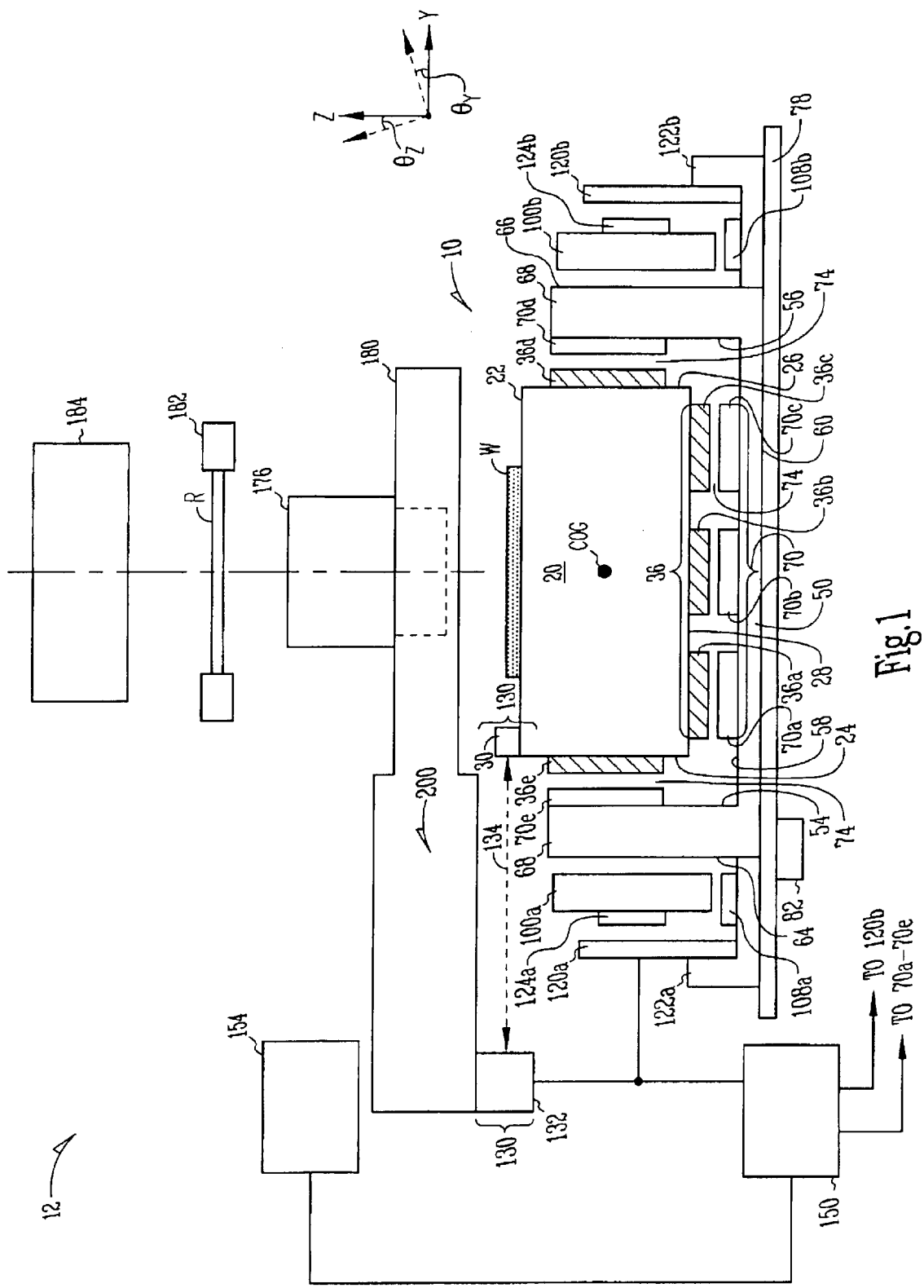
FIG. 1 is a schematic side view of a photolithography system that includes the maglev stage of the present invention.

With reference to FIG. 1, there is shown a schematic cross-sectional view of the maglev stage 10 of the present invention as part of a photolithography system 12. Maglev stage 10 includes a monolithic platen 20 having an upper surface 22, opposite sides 24 and 26, and a bottom surface 28 opposite the upper surface. Upper surface 22 supports a workpiece (wafer) W. In an example embodiment of the invention, platen 20 is monolithic. Platen upper surface 22 is sized to accommodate a workpiece W. For example, where the workpiece is a 300 mm wafer, an example dimension of upper surface 22 is 14"×14".

Figure 2:
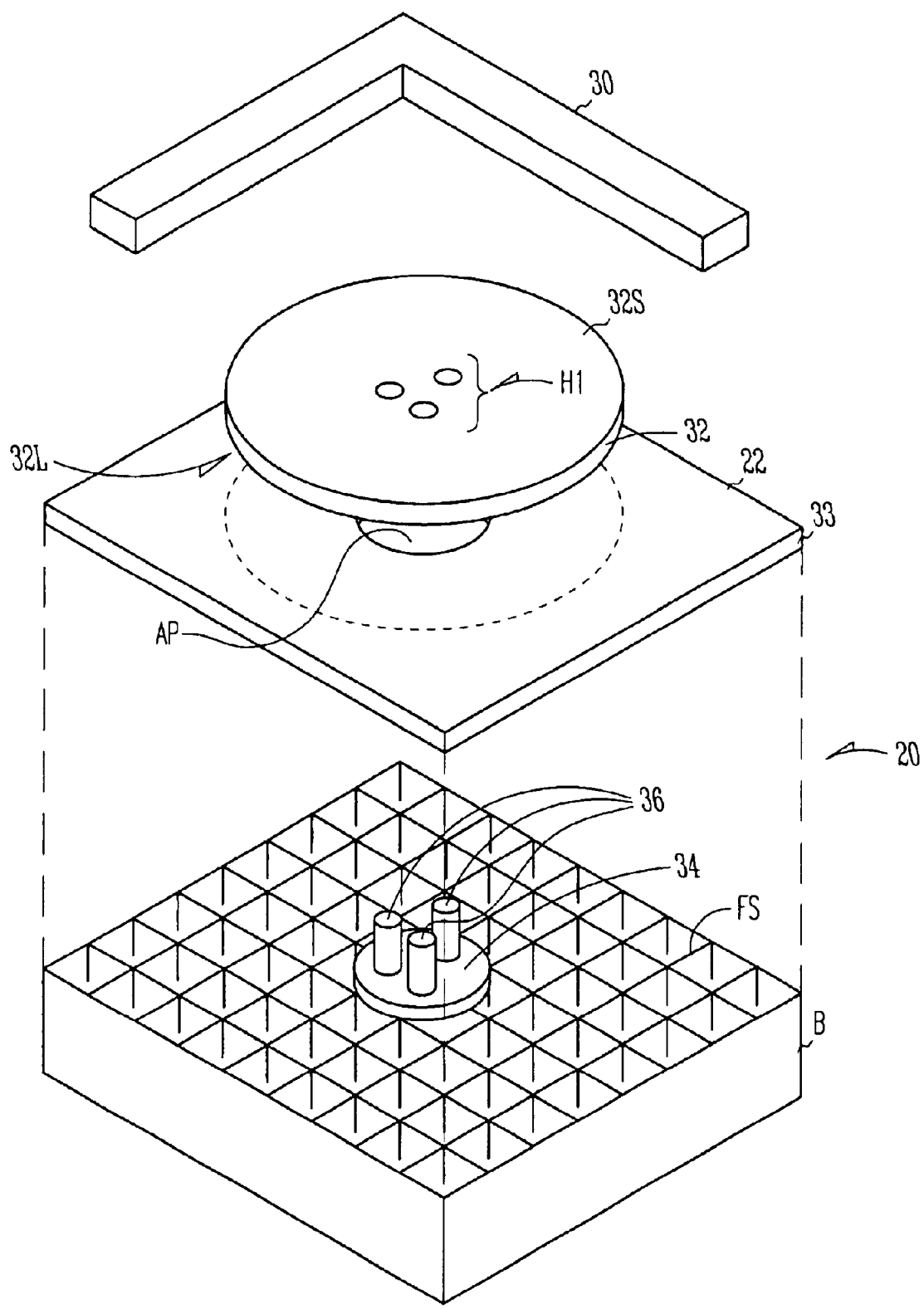
FIG. 2 is an exploded top-down perspective view of an example embodiment of the platen of the present invention showing the grid structure of the base, the top sheet that covers the open end of the base, along with the mirror system, the chuck and the wafer lift assembly.

Platen 20 also includes a mirror system 30 fixed thereto that is capable of reflecting light of a select wavelength from one or more light sources while the stage is being positioned and aligned. Mirror system 30 serves as part of an interferometer system, discussed below. Mirror system 30 has a sufficient number of reflective surfaces to provide position feedback in all six degrees of freedom. Mirror system 30 is preferably made of a thermally stable material, such as ZERODUR® available from Schott Janaer Glas, GmbH, Mainz, Germany. In an example embodiment, mirror system 30 may be formed integral with a chuck 32 having a surface 32S and a lower surface 32L (FIG. 2). Chuck 32 resides atop the platen and supports wafer W. Chuck 32 is preferably formed from a thermally stable material such as ZERODUR®.

Example Platen

With reference to FIG. 2, there is shown an exploded view of an example platen 20 comprising a base B with grid structure of bonded carbon fiber sheets FS. A face sheet 33 of a thermally stable material such as ZERODUR® or any similar ceramic material with a very low coefficient of thermal expansion such as ceramic or aluminum is bonded to an open end of the grid to form upper surface 22. The grid structure is preferably rectangular, though other grid structures (e.g., honeycombed) are possible. A separate "L" shaped mirror system 30 is fabricated and polished independently of bonded face sheet 33 and optically contacted thereto. The optical contacting of mirror system 30 to top face sheet 33 results in a permanent bond between the two.

Wafer Lift Assembly

Figure 3B:
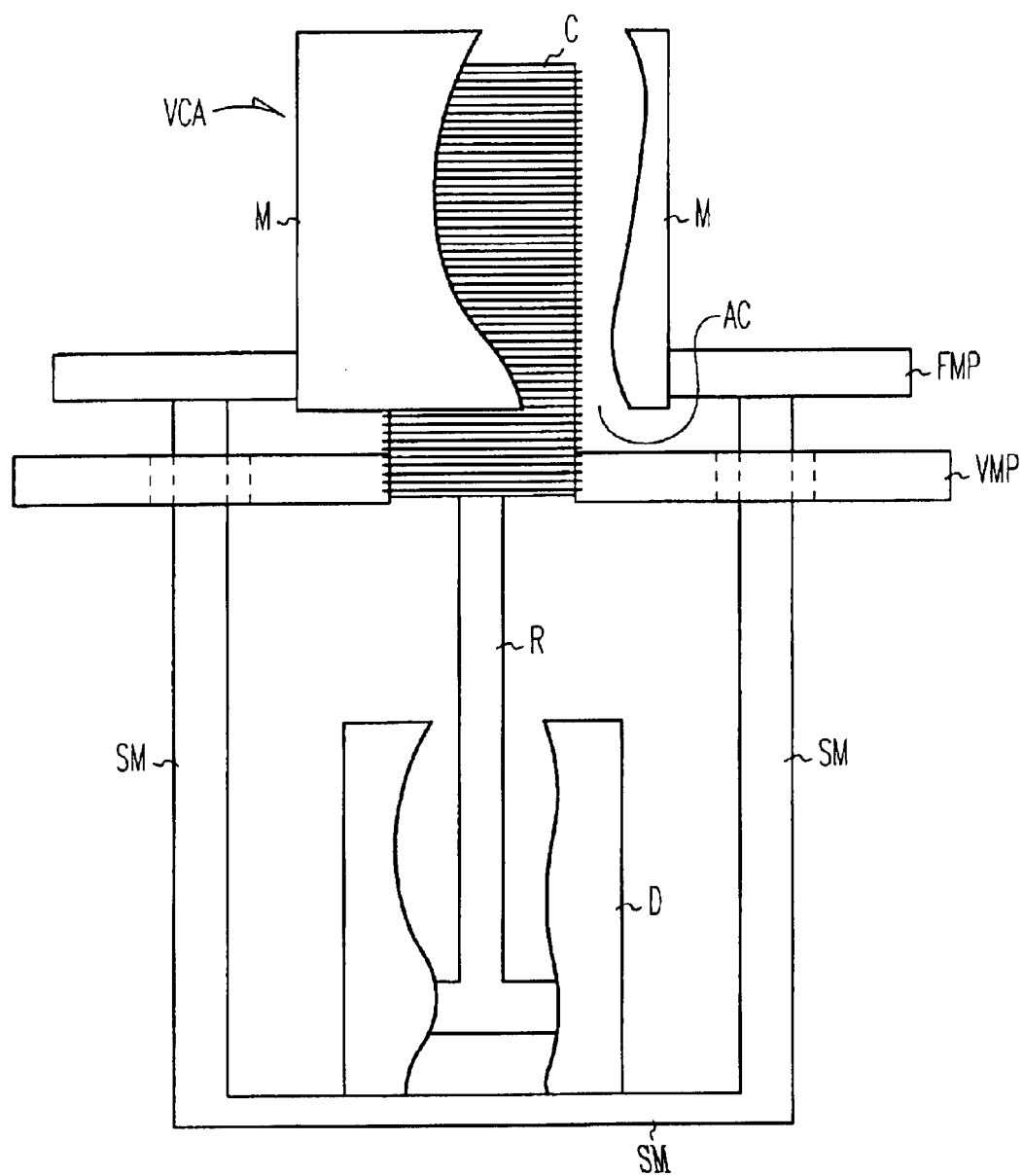
FIG. 3B is a cut-away close-up side view of the voice coil actuator of the wafer lift assembly of FIG. 3A, illustrating the arrangement of the fixed magnet, movable coil, and the damper connected to the movable coil.

With reference now also to FIGS. 3A and 3B, a wafer lift assembly 34 is arranged within base B and is coupled to chuck 32 through an aperture AP in face sheet 33. Assembly 34 is designed to lift (e.g., by ¼") and lower a wafer (not shown) onto and off chuck surface 32S with lifting pins 36 to provide access to the bottom surface of the wafer so that an arm of a wafer-handling robot (not shown) can engage the wafer. Assembly 34 fits at least partially within aperture AP in sheet 33 so that pins 36 extend through to chuck surface 32S via holes H1 formed in the chuck, and make contact with the underside of a wafer placed on the chuck surface.

In an example embodiment, pins 36 each have vacuum ports P at the center that allow the pins to engage the underside of the wafer with a vacuum to hold the wafer securely. Assembly 34 includes a fixed mounting plate FMP with a central aperture AC. Fixed mounting plate FMP is fixed relative to chuck lower surface 32L (not shown) so that it does not move relative to the chuck. A vertically movable plate VMP is arranged beneath fixed mounting plate FMP and is coupled thereto by a voice coil actuator VCA. Vertically movable plate VMP includes a number of spaced apart upwardly extending pins 36 (e.g., 3 pins located 120 degrees apart) near the edge of the plate.

Voice coil actuator VCA includes a movable coil C and a magnet M surrounding the coil (FIG. 3B). Magnet M is attached to fixed mounting plate FMP around central aperture AC. Fixed mounting plate FMP includes, near its edge, a number (e.g., 3 as shown) of porous air-bushings AB. In an example embodiment, arms AM1 that extend outwardly from central aperture AC are used to hold air-bushings AB. Air-bushings AB surround pins 36 and provide constrained non-contact movement of the pins in the vertical (Z) direction. In an example embodiment, air-bushings AB are attached to the underside 32L of chuck 32 to fix the fixed mounting plate FMP.

Movable coil C extends up into magnet M through fixed mounting plate central aperture AC. Thus, activation of voice coil actuator VCA causes magnet M to magnetically engage movable coil C to create a force that pulls vertically movable plate VMP vertically toward fixed mounting plate FMP. The upward movement of vertically movable plate VMP acts to move pins 36 within air-bushings AB and through corresponding holes H1 in chuck 32. The movement of pins 36 is initiated by an electrical signal from either stage controller 150 or main controller 154. The electrical signal drives a current amplifier CA, which produces an amplified signal used to activate voice coil actuator VCA. When pins 36 are in the retracted position, voice coil actuator VCA is off and no current flows. The command signal to current amplifier CA is thus either high or low.

In an example embodiment of assembly 34, the vertical motion of pins 36 is appropriately profiled by a damper D operably connected to movable coil C by a rod R (FIG. 3B). Damper D is connected to fixed mounting plate FMP by support members SM that pass through vertically movable plate VMP. The position profile of pins 36 is critically damped by the action of damper D on movable coil C through rod R so that the command signal does not require additional signal conditioning to provide damped motion.

Wafer lift assembly 34 of FIGS. 3A and 3B has a non-contact construction, i.e., pins 36 and fixed mounting plate FMP do not make physical contact with other parts of the assembly. This is important because of the highly repetitive wafer lifting operation performed by the assembly, estimated at about a million cycles per year. Non-contact construction of assembly 34 prevents the essential parts of the assembly from wearing out because of repetitive operation.

Magnet Arrays

Figure 4:
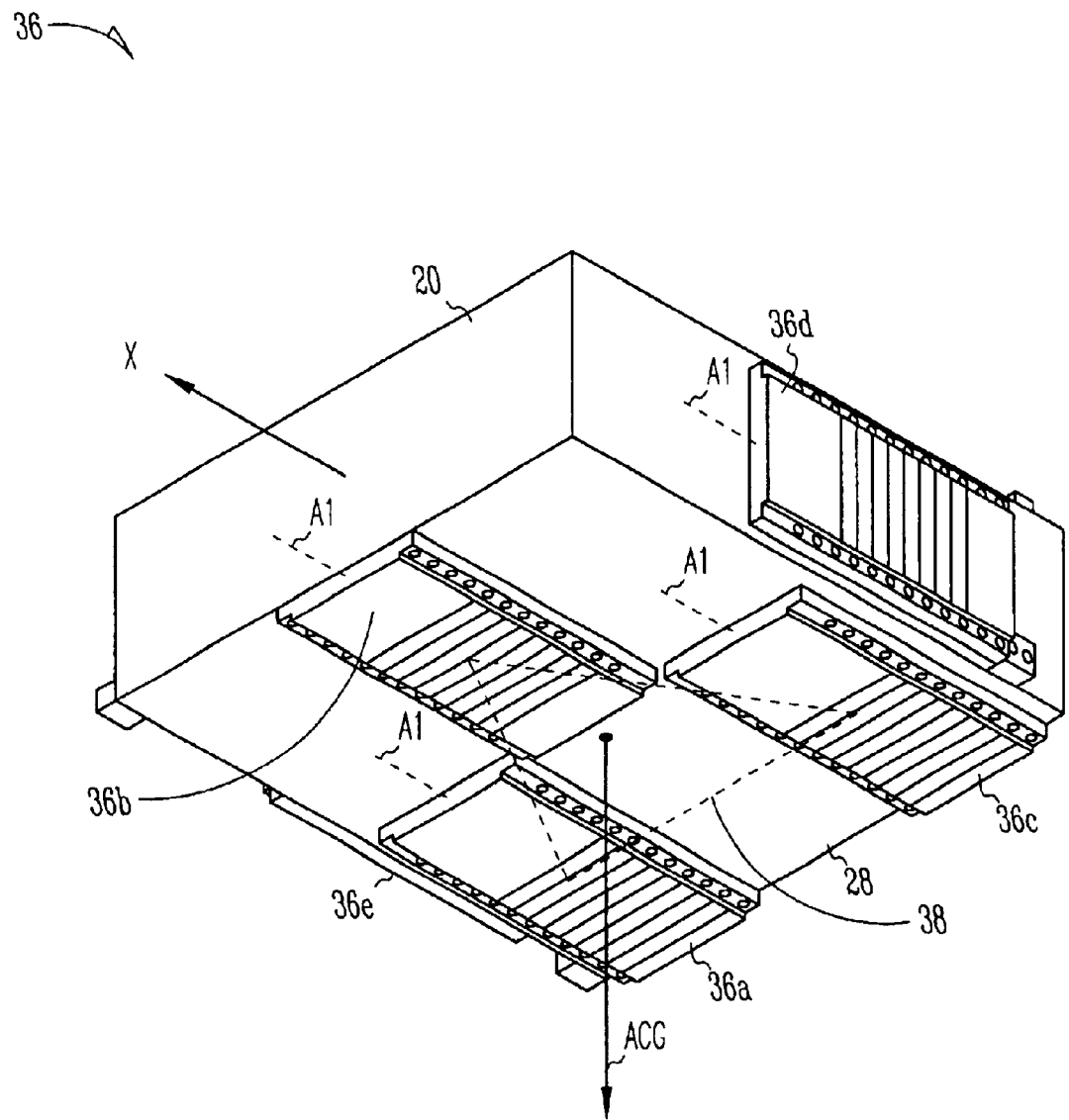
FIG. 4 is bottom-up isometric view of the platen of the maglev stage of FIG. 1, showing the three magnet arrays arranged on the lower surface of the platen.

With reference now to FIG. 4, attached to platen bottom surface 28 is a set of permanent magnet arrays 36. In an example embodiment, set of magnet arrays 36 includes three magnet arrays 36a–36c arranged at the vertices of an imaginary triangle 38 (dashed line) centered about an axis $A_{CG}$ passing through the center-of-gravity COG of the platen (FIG. 1). Each one of magnet arrays 36a–36c is preferably elongate with a long axis A1 that is arranged in a single direction, e.g., parallel to the X-direction. Attached to respective sides 24 and 26 are two more permanent side magnet arrays 36d and 36e. In an example embodiment, side magnet arrays 36d and 36e also each have an axis A1 arranged along the same direction as magnet arrays 36a–36c, as shown. Thus, in the example embodiment, a total of five magnet arrays are attached to the platen. The discussion below refers to set of magnet arrays 36 as including three magnet arrays 36a–36c in combination with two side magnet arrays 36d and 36e for the sake of illustration and is not meant to be limiting.

Magnet arrays 36a–36e are preferably relatively flat and rectangular in shape so that the mass added to the platen by attaching the magnet arrays thereto is distributed over the platen surface. This results in higher modal frequencies of the platen, which enables higher bandwidths and higher acceleration. Also, because there are no active control elements on platen 20, there is no subsequent thermal load, which can distort the platen as well as mirror system 30. In an example embodiment, magnet arrays 36a–36e each comprise an array of smaller magnets arranged in alternating north and south poles or arranged in a Halbach pattern. The smaller magnets may be square or rectangular in cross-section and have a remanence between about 1.0 T and about 1.5 T.

Motor Coils

Figure 5:
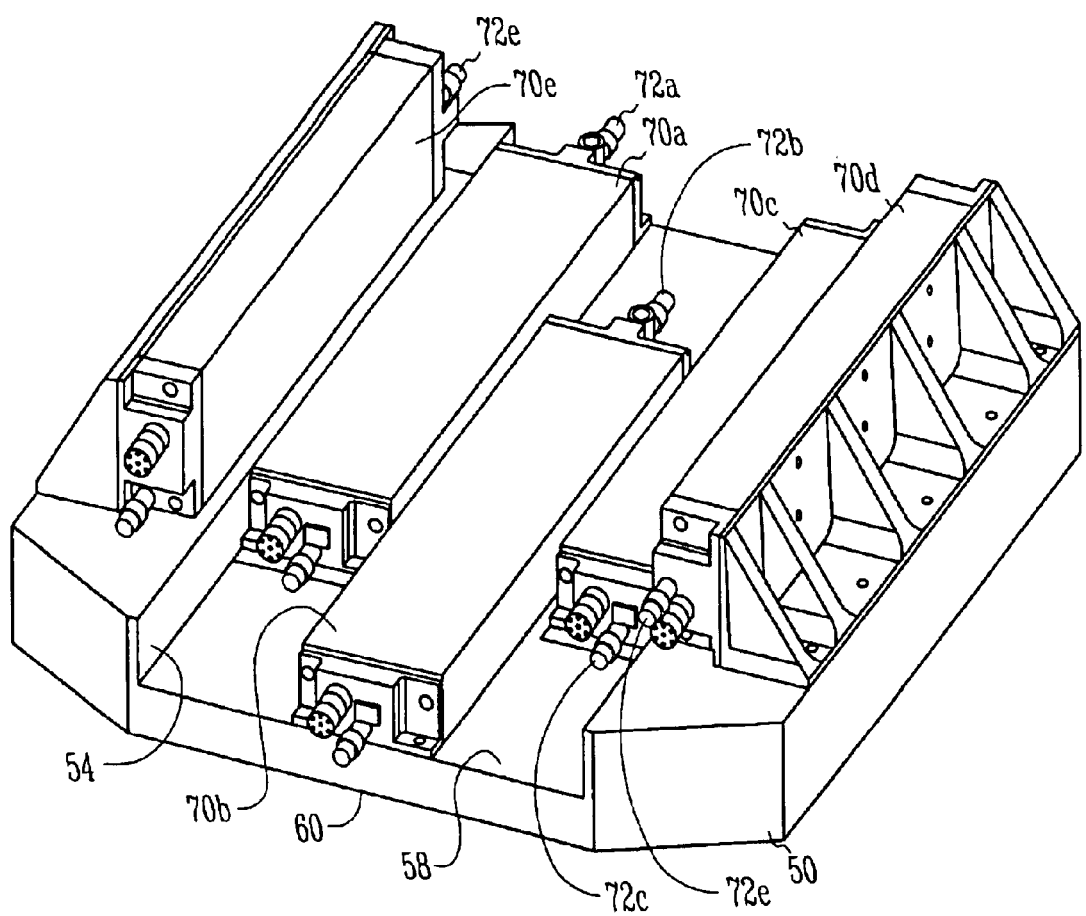
FIG. 5 is a top-down isometric view of the maglev stage of FIG. 1, with the platen removed, showing the U-shaped support frame with the five motor coils arranged thereon.
Figure 6:
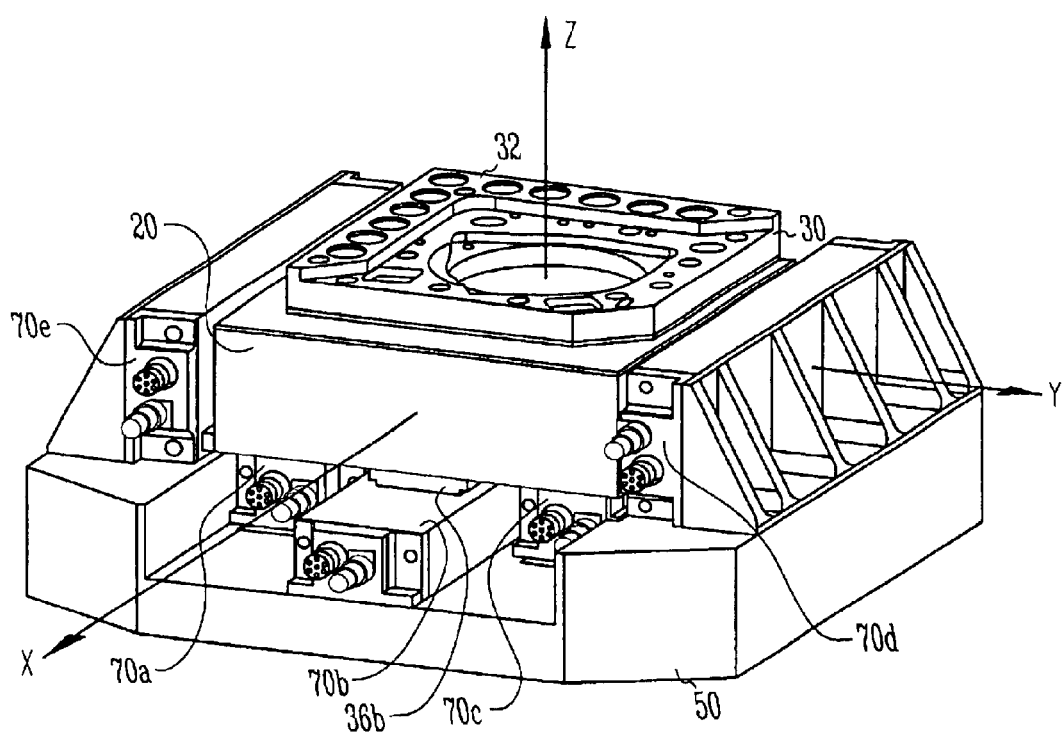
FIG. 6 is a detailed isometric view of the maglev stage of FIG. 1.

With continuing reference to FIG. 1 and also now to FIGS. 5 and 6, at least partially surrounding platen 20 on sides 24 and 26, and bottom surface 28 is a U-shaped support frame 50 having opposing inner sides 54 and 56, an inner bottom surface 58, an outer bottom surface 60, opposite outer sides 64 and 66, and an upper surface 68. Affixed to inner bottom surface 58 is a set of motor coils 70 (e.g., comprising motor coils 70a–70c) arranged opposite the set of magnet arrays 36 (e.g., magnet arrays 36a–36c) to be operatively (i.e., magnetically) coupled thereto. Affixed to respective sides 54 and 56 are two additional side motor coils 70d and 70e arranged opposite side magnet arrays 36d and 36e and operatively (i.e., magnetically) coupled thereto. In an example embodiment of the invention, motor coils 70a–70e are linear motors, such as Lorentz-force planar linear motors. In an example embodiment, motor coils 70a–70e are three phase linear motors approximately 3"×24" with a force constant of 30 N/A (Newtons per Ampere).

In an example embodiment, motor coils 70a–70e include respective cooling lines 72a–72e (FIG. 5) through which fluid can flow to transfer heat generated by the actuators away from platen 20 and mirror system 30. Magnet arrays 36a–36e and motor coils 70a–70e are arranged such that a small (e.g., 100 microns to 1 mm) gap 74 exists between the motor coils and the magnet arrays. The arrangement of magnet arrays 36a–36e and motor coils 70a–70e is such that platen 20 is magnetically suspended ("levitated") within frame 50 and can be moved in six degrees of freedom by selective activation of the motor coils. Here, activation of the motor coils may include, for example, changing the current amplitude provided thereto.

Specifically, motor coils 70a–70c and associated magnet arrays 36a–36c may be used to provide lift (levitation) and control of state (i.e., the position, orientation, velocity, acceleration, etc.) of platen 20 in three degrees of freedom (DOF), namely Z, $\theta_X$ and $\theta_Y$. Note that the three DOF are accomplished with actuators 70a–70c all oriented in a single DOF (i.e., along the X-direction). Likewise, actuators 70d and 70e and associated magnet arrays 36d and 36e (also oriented in the same single DOF) may be used to control the state of platen 20 in the remaining three DOF, namely X, Y and $\theta_Z$. This decoupling into two separate three-DOF systems is a preferred arrangement, however the stage is not limited to this arrangement.

In an example embodiment, the travel range of platen 20 in the X direction is approximately 350 mm, in the Z direction is approximately 1 mm and in the Y-direction is approximately 750 microns. Travel along the X-direction can be performed in increments as small as nanometers. Further, the angular ranges of motion for $\theta_X$, $\theta_Y$ and $\theta_Z$ can be up to 1.5 milliradians and in increments as small as nanoradians. Further, stage velocities of up to 1 m/sec. and accelerations greater than 2 g are possible.

Since magnet arrays 36a–36c are located equidistant from the platen center-of-gravity axis $A_{CG}$ (FIG. 4), the center-of-force exerted by motor coils 70a–70c on these magnet arrays is on this axis. Thus, the three DOF associated with these magnet arrays and actuators are de-coupled from the three DOF associated with magnet arrays 36d–36e and motor coils 70d–70e, which also have a center-of-force directed through the COG axis by virtue of these magnet arrays being symmetrically positioned about the COG on platen sides 24 and 26.

Rails for Long Travel

Referring again to FIG. 1, frame 50 is supported on one or more rails 78 upon which the frame can move in a constrained manner in a long travel axis in a direction along the rails (i.e., the Y-direction). In an example embodiment, frame 50 is moved along the long travel axis on rails 78 using a drive system 82, which may include conventional actuators and bearings. Example actuators include motors (linear and rotating), pneumatic, hydraulic, piezoelectric and electromagnetic (Lorentz) motors. Example bearings include sliding contact, rolling elements, air, hydrostatic, and magnetic bearings. Further, example actuators and bearings suitable for use in the present invention are described in U.S. Pat. No. 5,699,621, which patent is incorporated by reference herein.

Counterweights

With continuing reference to FIG. 1, in a preferred embodiment of the invention, two counterweights 100a and 100b are supported by bearings 108a and 108b and counterweight actuators 120a and 120b coupled to the counterweights. Bearings 108a and 108b, and counterweight actuators 120a and 120b are mounted to respective arms 122a and 122b that extend outwardly from respective sides 64 and 66.

Arms 122a and 122b may be mounted to or formed integral with frame 50 at sides 64 and 66. Counterweights 100a and 100b are thus arranged adjacent respective outer sides 64 and 66. While it is possible to mount counterweight actuators 120a and 120b to outer sides 64 and 66, the proximity to motor coils 70e and 70d mounted on the inner surfaces 54 and 56 of the frame can result in electrical interference.

In general, the mass of counterweights 100a and 100b can be any proportion of the mass of platen 20. The ability of the counterweights to counter the accelerating force of the platen is dictated by the acceleration of the counterweights. Thus, if the counterweights have masses of M1 and M2 respectively and the platen has a mass M3 and an acceleration a3, then the accelerations a1 and a2 for the counterweights that counter the accelerating force of the platen is determined by the equation:

$$(M1)(a1)+(M2)(a2)+(M3)(a3)=0.$$

For example, if each counterweight has a mass twice that of the platen, then each counterweight is accelerated at ¼ of the acceleration of the platen to cancel the platen acceleration force.

For ease of design, in an example embodiment, counterweights 100a and 100b preferably have equal or substantially equal mass. Further, the mass of each counterweight is preferably equal to or substantially equal to half the mass of platen 20. Thus, in an example embodiment, counterweights 100a and 100b each has a mass of about 20 kg which is about equal to the mass of an example carbon-fiber platen 20 (FIG. 2) having a dimension of about 15"×14"×4" ('' denotes inches). Counterweights 100a and 100b can be made of almost any material, but are preferably made of heavy metals such as tungsten, steel, and brass.

Counterweights 100a and 100b are capable of moving parallel to sides 64 and 66 on bearings 108a and 108b, which may be any one of the conventional bearings mentioned above, and in an example embodiment are air bearings. Counterweight actuators 120a and 120b are arranged adjacent counterweights 100a and 100b opposite frame 50 and are in magnetic communication with magnet arrays 124a and 124b mounted to the counterweights. In an example embodiment, magnet arrays 124a and 124b are similar or identical to magnet arrays 36a–36e mounted to the platen. In this case, the magnet arrays serve as part of each counterweight, so that the mass of the magnet arrays must be taken into account.

In an example embodiment, counterweight actuators 120a and 120b each comprise a linear motor, similar or identical to motor coils 70a–70e attached to the frame. Counterweight actuators 120a and 120b thus magnetically engage the counterweights and provide the force necessary for moving the counterweights on respective air bearings 108a and 108b in opposition to platen 20 in the three DOF X, Y, and $\theta_Z$. The opposition movement of counterweights 100a and 100b relative to the platen acts to cancel the accelerating force of maglev stage 10, which results in less vibration generated by the movement of the platen. Though the range of motion of counterweights 100a and 100b is greatest along the X-direction, even small amounts of movement (e.g., from tens of nanometers to tens of microns in the Y-direction and micro-radians to milliradians in $\theta_Z$ provide the additional degrees of freedom needed to counter small movements of the platen in the Y-direction and the $\theta_Z$ direction. In the example embodiment of the invention that represents a simplification of the design, counterweight actuators 120a and 120b are designed to move counterweights 100a and 100b in a single DOF (i.e., along the X-direction).

Interferometer System

Stage 10 further includes an interferometer system 130 that includes a coherent light source 132 arranged in optical communication with mirror system 30 so that a light beam 134 emanating from the light source is incident mirror system 30 and is reflected back to the light source. Interferometer system 130 is capable of accurately measuring the state (e.g., position and velocity) of platen 20 relative to a reference position. More than one interferometer may be used to measure the state of platen 20 along other axes so that the state of the platen over multiple degrees of freedom can be determined.

Figure 7:
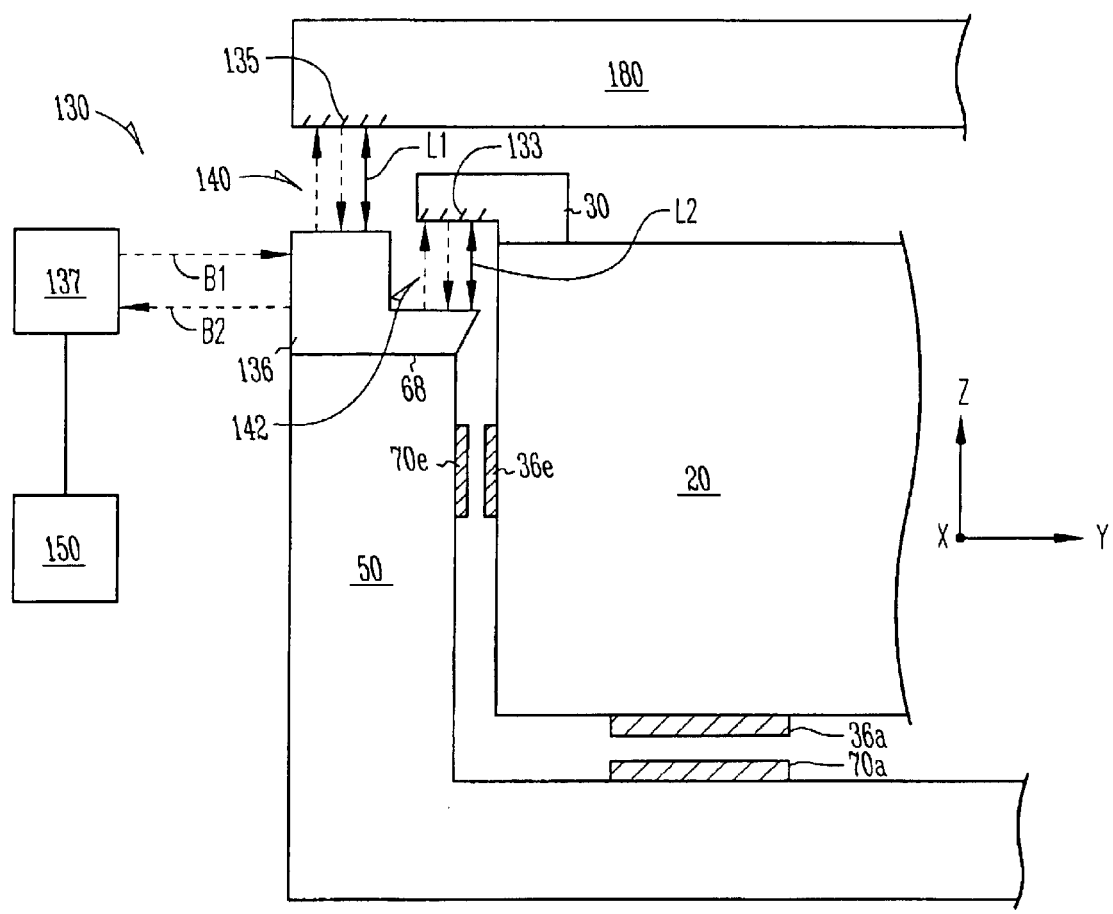
FIG. 7 is a close-up side view of an example differential interferometer system as incorporated with the maglev stage and photolithography system of FIG. 1.

With reference to FIG. 7, there is shown a close-up view of an example interferometer system 130 suitable for use in the present invention. System 130 includes mirror system 30 with a first horizontal mirror 133, a second horizontal mirror 135 as part of a stable support structure 180 (discussed below), and an optical system 136 optically coupled to mirrors 133 and 135 and mounted to support frame 50 atop upper surface 68. As discussed above, system 130 further includes coherent light source 132, such as a HeNe laser, that provides an input light beam Bi to optical system 136. Optical system 136 has two vertical (i.e., Z-direction) optical paths: a first optical path 140 with length L1 between optical system 136 and mirror 135, and a second optical path 142 with length L2 between the optical system and mirror 133. The difference between optical path lengths L1 and L2 determines the location of platen 20 relative to support frame 50. Thus, interferometer system 130 of FIG. 7 constitutes a differential interferometer. Data pertaining to the difference in the optical path lengths (and thus the relative position of platen 20) is provided in a return light beam B2.

Stage Controller

Referring again to FIG. 1, the data produced by one or more interferometer systems 130 are provided to a stage controller 150, which is in electrical communication with interferometer system 130, motor coils 70a–70e and counterweight actuators 120a and 120b. Stage controller 150 is capable of calculating the state of platen 20 based on the interferometer data and motor coils 70a–70e to provide the necessary movement of the platen to change its state. Stage controller 150 also may activate counterweight actuators 120a and 120b to initiate movement of counterweights 100a and 100b when it is deemed desirable or necessary to provide a reaction force to the movement of the platen. The decision to move counterweights 100a and 100b in a particular direction and speed can be made by suitably programming stage controller 150.

Stage controller 150 is also preferably connected to a main controller 154 that controls the operation of photolithography system 12 so that the exposure of wafer W and the movement of the wafer in system 12 is properly synchronized. In an example embodiment of the invention, stage controller 150 is part of main controller 154.

Photolithography System

With reference to FIG. 1, also included in photolithography system 12 is a projection lens 176 supported by support structure 180, a reticle stage 182 that supports a reticle R, and an illumination system 184 that illuminates the reticle so that it can be imaged by the projection lens onto wafer W. Support structure 180 may also support interferometer 130, as shown. Such an arrangement is preferable because it decouples the measurement of the platen state with the force loop used to move the platen.

Method of Operation

With continuing reference to FIG. 1, stage 10 operates as follows. When wafer W needs to be moved relative to projection lens 176 (or some other reference position), stage controller 150 sends an electrical signal to motor coils 70a–70e. Depending on the nature of the required movement, select ones of motor coils 70a–70e engage corresponding ones of magnet arrays 36a–36e so as to provide the force necessary to initiate motion of platen 20 with up to six degrees of freedom. The position of magnetic arrays 36a–36e and motor coils 70a–70e are such that the forces generated on the platen by each magnet-motor coil combination are directed through the center of gravity through corresponding DOF axes passing through the center of gravity.

When necessary (e.g., for high-g stage accelerations), simultaneous with the activation of motor coils 70a–70e, counterweight actuators 120a and 120b may be optionally activated by an electrical signal sent from stage controller 150. Counterweight actuators 120a and 120 move counterweights 100a and 100b to oppose the motion of platen 20 to counter the reactive forces applied by motor coils 70a–70e to platen 20. The force applied by counterweight actuators 120a and 120b is designed to cancel the force of stage 10 so that there is a reduced, or zero, net force applied to the surrounding structure (e.g., support structure 180) when the platen is moved.

Accordingly, the present invention includes a method of patterning a photosensitive wafer. With reference to FIG. 1, the method includes supporting the photosensitive wafer on platen 20 of maglev stage 10. Reticle R supported by reticle stage 182 is then repeatedly illuminated with radiation having a wavelength that activates the photosensitive wafer. An image of the reticle is then formed at the wafer for each repeated illumination. During the repeated illuminations, the wafer is moved via maglev stage 10 in up to six degrees of freedom so as to form an exposure field on the wafer for each image. In an example embodiment of the method, during the movement of the platen, the counterweights are moved in opposition to the platen to cancel the overall force of the stage.

As mentioned above, platen 20 may be monolithic. The use of a monolithic platen in the present invention is made possible by combining the force loops associated with magnet arrays 36a–36e and motor coils 70a–70e and the metrology loop associated with interferometer system 130 and support structure 180. In prior art stages, kinematic mounts are used to support the portion of the wafer carrier (platen) that includes the mirror system used by the interferometer to measure the platen state. In an example embodiment of the present invention, five magnet arrays 36a–36e provide the kinematic constraining forces that, in the prior art, require separate kinematic mounts. Further, as mentioned above, the geometry of the magnet arrays and associated actuators is such that the kinematic control forces are directed through the platen's center of gravity for all six degrees of freedom. This allows for the efficient application of force to the platen.

The design of stage 10 is such that power is not dissipated in the platen because only magnet arrays reside on the platen; there are no active heat-producing components (e.g., actuators) on the platen. Accordingly, there is no direct joule-heating of the platen by the motor coils. This obviates the need to cool the platen, which means fewer cooling lines are needed for the stage and a simpler design overall. Only the set of motor coils residing on frame 50 generate heat that may need to be dissipated through cooling. This can be accomplished through cooling lines 72a–72e.

Another benefit of the design of maglev stage 10 is that the force applied to platen 20 is only weakly dependent on the change in the size of gap 74 between the motor coils and the magnet arrays. This is accomplished by using linear actuators, such as Lorentz-force actuators, that are relatively insensitive to the gap spacing. In the prior art, variable reluctance actuators are used, wherein the actuator force varies strongly (i.e., as the square) of the gap spacing, requiring the gap spacing to be carefully measured. The present invention does not require measuring the gap spacing, and so does not require the additional instrumentation (e.g., capacitive gauges) usually used to measure the gap spacing.

A further benefit of the design of maglev stage 10 is that the surfaces of the platen do not need to be highly finished because the platen is not in mechanical contact with the support frame. This is an important because a good deal of cost is involved in finishing bearing surfaces in prior art stages.

The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A magnetic levitation (maglev) stage apparatus, comprising:
   a platen having an upper surface capable of supporting a workpiece;
   a set of magnet arrays arranged on a bottom surface of the platen;
   first and second side magnet arrays arranged on respective opposite first and second sides of the platen;
   a support frame at least partially surrounding the platen on the first and second sides and the bottom surface;
   a plurality of motor coils arranged on the support frame so as to be in operable communication with the set of magnet arrays and the first and second side magnet arrays; and
   wherein the set of magnet arrays and first and second side magnet arrays and the plurality of motor coils are operable to magnetically levitate the platen within the support frame and move the platen in up to six degrees of freedom (DOF).

2. The apparatus of claim 1, wherein the set of magnet arrays includes first, second and third magnet arrays.

3. The apparatus of claim 2, where the first, second and third magnet arrays are arranged at the apexes of an imaginary triangle centered about an axis passing through a center-of-gravity of the platen.

4. The apparatus of claim 1, wherein the support frame is U-shaped.

5. The apparatus of claim 1, wherein the platen is monolithic.

6. The apparatus of claim 1, wherein the platen comprises a material selected from the group of materials consisting of: carbon fiber, Zerodur, ceramic and aluminum.

7. The apparatus of claim 1, wherein the platen upper surface is sized to support a 300 mm semiconductor wafer.

8. The apparatus of claim 1, wherein the motor coils comprise linear motors.

9. The apparatus of claim 8, wherein the linear motors include Lorentz force planar linear motors.

10. The apparatus of claim 2, wherein the first, second and third magnet arrays each have a long axis that is oriented in a first direction.

11. The apparatus of claim 10, wherein the first and second side magnet arrays each have a long axis that is oriented in the first direction.

12. The apparatus of claim 1, further including a mirror system fixed to the platen and adapted to reflect light from one or more mirrored surfaces.

13. The apparatus of claim 12, wherein the mirror system is formed integral with a chuck residing atop the platen upper surface.

14. The apparatus of claim 12, wherein the mirror system is optically connected to the platen surface.

15. The apparatus of claim 12, further including one or more interferometers in optical communication with the mirror system to provide data pertaining to the state of the platen relative to a reference position.

16. The apparatus of claim 1:
wherein the set of magnet arrays, first and second side magnet arrays and the plurality of motor coils define a force loop to apply a force to the platen;
wherein the one or more interferometers reside on a support structure define a measurement loop to measure the state of the platen; and
wherein the force loop and the measurement loop are coupled.

17. The apparatus of claim 15, further including a stage controller connected to the motor coils and to the one or more interferometers.

18. The apparatus of claim 17, wherein the stage controller is connected to or is part of a main controller of a photolithography system.

19. The apparatus of claim 1, further including one or more rails that movably support the support frame.

20. The apparatus of claim 19, further including actuators and bearings operatively coupled to the one or more rails to provide a force to move the support frame over the one or more rails.

21. The apparatus of claim 1, wherein at least one of the motor coils includes a cooling line.

22. The apparatus of claim 1, further including:
first and second counterweights arranged adjacent-respective first and second outer sides of the support frame and adapted to move in opposition to the platen.

23. The apparatus of claim 22, wherein the first and second counterweights are operatively coupled to first and second bearings and first and second counterweight actuators to provide a force to move the counterweights.

24. The apparatus of claim 22, wherein the first and second counterweights have equal or substantially equal mass.

25. The apparatus of claim 22, wherein the platen has a mass and the first and second counterweights each have a mass that is substantially equal to half of the platen mass.

26. The apparatus of claim 22, wherein the first and second counterweights are adapted to move parallel to the first and second outer sides of the support frame.

27. The apparatus of claim 23, wherein the first and second bearings are air bearings.

28. The apparatus of claim 23, wherein the first and second counterweight actuators comprise linear motors.

29. The apparatus of claim 23, further including a stage controller connected to the motor coils and to the first and second counterweight actuators.

30. The apparatus of claim 22, further including a mirror system fixed to the platen and adapted to reflect light from one or more mirrored surfaces.

31. The apparatus of claim 30, wherein the mirror system is formed integral with a chuck residing atop the platen upper surface.

32. The apparatus of claim 30, further including one or more interferometer systems in optical communication with the mirror system to provide data to a stage controller pertaining to a state of the platen relative to a reference position.

33. The apparatus of claim 32, wherein the stage controller is further connected to the motor coils and the first and second counterweight actuators to control the state of the platen.

34. The apparatus of claim 1, further including:
a projection lens arranged adjacent the upper surface of the platen;
a reticle stage arranged adjacent the projection lens and opposite the platen for supporting a reticle; and
an illumination system arranged adjacent the reticle to illuminate the reticle so as to form an image of the reticle on the workpiece when supported by the platen upper surface.

35. The apparatus of claim 22, further including:
a projection lens arranged adjacent the upper surface of the platen;
a reticle stage arranged adjacent the projection lens and opposite the platen for supporting a reticle; and
an illumination system arranged adjacent the reticle to illuminate the reticle so as to form an image of the reticle on the workpiece when supported by the platen upper surface.

36. A method of moving a workpiece supported by a platen, comprising:
arranging a plurality of magnet arrays on one or more of the platen surfaces so that the magnet arrays are arranged symmetrically about the center of gravity of the platen;
providing motor coils on a support frame that partially surrounds the platen; and
operatively coupling the motor coils one to each magnet array so that one or more forces may be applied to the platen along one or more axes passing through a center of gravity of the platen to move the platen in up to six degrees of freedom.

37. The method of claim 36, further including:
activating one or more of the motor coils so as to move the platen in one or more of the six degrees of freedom.

38. The method of claim 36, including arranging counterweights adjacent the platen, the counterweights being movable in opposition to movement of the platen.

39. The method of claim 38, further including moving the counterweights in opposition to movement of the platen.

40. The method of claim 38, including moving the counterweights in a single degree of freedom.

41. The method of claim 35, further including movably supporting the support frame by one or more rails.

42. The method of claim 41, further including moving the support frame along the one or more rails.

43. The method of claim 38, further including movably supporting the support frame by one or more rails.

44. The method of claim 43, further including moving the support frame along the one or more rails.

45. The method of claim 36, further including interferometrically monitoring the state of the platen and providing data concerning the state of the platen to a stage controller.

46. The method of claim 38, further including interferometrically monitoring the state of the platen and providing data concerning the state of the platen to a stage controller.

47. The method of claim 39, further including moving the movable counterweights using bearings and actuators.

48. A method of patterning a photosensitive wafer utilizing a magnetic levitation (maglev) stage having a platen with an upper surface, a set of magnet arrays arranged on a bottom surface of the platen, first and second side magnet arrays arranged on respective opposite first and second sides of the platen, a support frame at least partially surrounding the platen on the first and second sides and the bottom surface, and a plurality of motor coils arranged on the support frame so as to be in operable communication with the set of magnet arrays and the first and second side magnet arrays, wherein the set of magnet arrays and first and second side magnet arrays and the plurality of motor coils are operable to magnetically levitate the platen within the support frame and move the platen in up to six degrees of freedom (DOF), the method comprising the steps of:
- supporting the photosensitive wafer on the upper surface of the maglev stage;
- repeatedly illuminating a reticle with radiation having a wavelength that activates the photosensitive wafer;
- forming an image of the reticle at the wafer for each repeated illumination; and
- moving the wafer on the maglev stage in up to six degrees of freedom so as to form an exposure field on the wafer for each image.

49. A method of patterning a photosensitive wafer utilizing a magnetic levitation (maglev) stage having a platen with an upper surface, a set of magnet arrays arranged on a bottom surface of the platen, first and second side magnet arrays arranged on respective opposite first and second sides of the platen, a support frame at least partially surrounding the platen on the first and second sides and the bottom surface, a plurality of motor coils arranged on the support frame so as to be in operable communication with the set of magnet arrays and the first and second side magnet arrays, and first and second counterweights arranged adjacent respective first and second outer sides of the support frame and adapted to move in opposition to the platen, wherein the set of magnet arrays and first and second side magnet arrays and the plurality of motor coils are operable to magnetically levitate the platen within the support frame and move the platen in up to six degrees of freedom (DOF), the method comprising the steps of:
- supporting the photosensitive wafer on the upper surface of the platen of the maglev stage;
- repeatedly illuminating a reticle with radiation having a wavelength that activates the photosensitive wafer;
- forming an image of the reticle at the wafer for each repeated illumination;
- moving the platen of the maglev stage in up to six degrees of freedom to form an exposure field on the wafer for each image; and
- moving the counterweights in opposition to the movement of the platen.

50. The apparatus of claim 1 wherein the platen includes:
- a carbon fiber base having a grid structure with an open end; and
- a sheet of a first thermally stable material fixed to the open end to form a platen upper surface.

51. A platen according to claim 50, further including a mirror system of a second thermally stable material fixed to the platen upper surface.

52. The platen of claim 50, wherein the grid structure is formed in a rectangular array comprising carbon fiber sheets.

53. The platen of claim 51, wherein the mirror system is optically contacted to the platen upper surface.

54. The platen of claim 50, further including a chuck formed from a third thermally stable material arranged atop the platen upper surface.

55. The platen of claim 50, further including a workpiece lifting system arranged in the platen, the workpiece lifting system including lifting pins that pass through holes in the platen upper surface and that extend to the chuck upper surface, the lifting pins being vertically movable to lift a workpiece arranged on the chuck upper surface.

56. The platen of claim 51, wherein the first and second thermally stable materials are the same.

57. The platen of claim 56, wherein the first and second thermally stable materials comprise ZERODUR®.

58. The platen of claim 54, wherein the first, second and third thermally stable materials are the same.

59. The apparatus as in claim 1 further comprises an interferometer system that includes:
- a mirror system attached to a platen magnetically supported within a support frame, the mirror system including a first horizontal mirror;
- a second horizontal mirror formed on a stable support structure;
- an optical system mounted to the support frame and optically coupled to the first and second horizontal mirrors along respective first and second optical paths; and
- a light source optically coupled to the optical system for providing an input beam into the optical system to produce a return beam that includes positional information about the platen relative to the support structure.

60. The system of claim 59, wherein the light source includes a HeNe laser.

61. The system of claim 59, wherein the light source is capable of receiving the return beam.

62. The method of claim 45 wherein the step of interferometrically monitoring further includes the steps of:
- reflecting a first light beam from a first horizontal mirror attached to a movable platen capable of supporting a workpiece;
- reflecting a second light beam from a second horizontal mirror attached to a stable support structure;
- interfering the first and second light beams using an optical system to obtain a third return beam that includes information about a state of the platen relative to a reference.

63. The method of claim 62, including providing the first and second light beams from a light source optically coupled to the optical system.

64. The method of claim 62, wherein the reference is the stable support structure.

65. The method of claim 64, further including sending the first light beam over a first optical path of length L1, sending the second light beam over a second optical path of length L2, and measuring the difference between the lengths L1 and L2.

66. The apparatus of claim 1 wherein:
- the platen includes a chuck; and
- the stage includes a wafer lift assembly having:
  - a mounting plate fixed relative to the chuck, the mounting plate having a lower surface and a central aperture;

a plurality of air-bushings attached to the mounting plate surrounding the central aperture;

a movable plate having an upper surface arranged adjacent the lower surface of the mounting plate and movably coupled thereto by a voice coil actuator; and a plurality of pins extending upwardly from the movable plate upper surface and engaged by the air-bushings to be movable therewithin when the movable plate is moved by activation of the voice coil actuator.

67. The assembly of claim 66, wherein the voice coil assembly comprises a movable coil fixed to the movable plate and extending upwardly through the mounting plate central aperture, and a magnet fixed to the mounting plate and surrounding the movable coil.

68. The assembly of claim 66, wherein the mounting plate includes a plurality of outwardly extending arms, and one air-bushing is attached to each arm.

69. The assembly of claim 67, further including a damper operatively coupled to the movable coil to damp the motion of the coil.

70. The assembly of claim 67, further including a current amplifier connected to the voice coil to provide an amplified current signal thereto.

* * * * *